(12) United States Patent
Morris

(10) Patent No.: US 6,346,191 B1
(45) Date of Patent: Feb. 12, 2002

(54) FILTER DEVICE FOR AIRCRAFT

(76) Inventor: Stephen V. A. Morris, Kleivveien 13, Bekkestua (NO), 1356

( * ) Notice: Subject to any disclaimer, the term of this patent is extended or adjusted under 35 U.S.C. 154(b) by 0 days.

(21) Appl. No.: 09/555,750
(22) PCT Filed: Nov. 26, 1998
(86) PCT No.: PCT/NO98/00351
§ 371 Date: Jul. 11, 2000
§ 102(e) Date: Jul. 11, 2000
(87) PCT Pub. No.: WO99/27831
PCT Pub. Date: Jun. 10, 1999

(30) Foreign Application Priority Data

Dec. 2, 1997 (NO) .................................. 5552/97

(51) Int. Cl.$^7$ ................................................ B01D 35/02
(52) U.S. Cl. .................. 210/164; 210/203; 210/506; 210/508; 4/290; 4/292
(58) Field of Search .................. 210/163, 164, 210/504, 506, 507, 508, 509, 632, 203, 206; 4/290, 292

(56) References Cited

U.S. PATENT DOCUMENTS

| 1,116,543 A | * | 11/1914 | Barker | 4/290 |
| 2,690,569 A | * | 10/1954 | Kozerski | 4/292 |
| 3,506,582 A | * | 4/1970 | Gertzman | 210/632 |
| 4,063,315 A | | 12/1977 | Carolan et al. | |
| 4,448,695 A | | 5/1984 | Gordon et al. | |
| 4,810,385 A | * | 3/1989 | Hater et al. | 210/632 |
| 5,591,339 A | | 1/1997 | Robinson | |
| 5,820,762 A | * | 10/1998 | Bamer et al. | 210/164 |
| 5,925,241 A | * | 7/1999 | Aldridge et al. | 210/163 |
| 5,965,030 A | * | 10/1999 | Williams et al. | 210/507 |
| 6,106,707 A | * | 8/2000 | Morris et al. | 210/163 |

FOREIGN PATENT DOCUMENTS

| EP | 0080761 | 6/1993 |
| JP | 6154107 A | 6/1994 |
| JP | 6182336 A | 7/1994 |
| JP | 7148080 A | 6/1995 |
| JP | 8290801 A | 11/1996 |
| JP | 9025001 A | 1/1997 |

* cited by examiner

Primary Examiner—Christopher Upton
(74) Attorney, Agent, or Firm—Baker Botts L.L.P.

(57) ABSTRACT

There is described a filter device for placement in a utility sink in an aircraft for filtering particulate material, and for dissolving and/or absorbing fatty compounds from the waste fluid, which device comprises a basin (1) having one or more bottom outlets (2) and a filter element (3) located at the bottom of the basin, which basin (1) has a shape adapted to the shape of the sink. The bottom outlet (2) in the basin (1) is made up of a plurality of through-going apertures. The filter element (3) consists preferably of a porous plastic material or wire netting web coated or impregnated with an enzyme- and/or soap-containing compound.

3 Claims, 1 Drawing Sheet

FILTER DEVICE FOR AIRCRAFT

FIELD OF THE INVENTION

The present invention relates to a filtering device for utility sinks in aircraft in accordance with the preamble of claim 1.

BACKGROUND OF THE INVENTION

Clogged sinks in aircraft, especially jet planes, constitute a major problem for airline companies throughout the world.

Due to civil aviation authority requirements, it is common practice for cabin personnel prior to landing to pour all remains from meal service, e.g., coffee, tea, orange juice, milk, etc., into the utility sink. The drainage outlet from the sinks in aircraft is usually led via a pipe2 from the sink to the outside of the fuselage. Due to the considerable pressure difference between the inside and outside of the fuselage, this drainage pipe is very thin and therefore may easily become blocked. Because of the major temperature variations existing between the inside and the outside of the fuselage, the last section of the conduit prior to the outlet on the outside of the fuselage is provided with a heating element to prevent its becoming frozen. This heating element usually has such a high temperature that a portion of the components in the waste fluid can easily become burned onto the wall of the pipe and, in time, clog up the pipe.

If the drain from the utility sink becomes clogged, there have been a number of instances where leakage from such sinks has resulted in major corrosion problems on the aircraft fuselage. In addition, delays could occur in aircraft departure due to the necessary work involved in opening clogged drains. These problems could result in major costs for the airline companies.

The purpose of the present invention is therefore to provide a filter device which effectively removes particulate material from the waste fluid so that the risk of clogging of the drain pipe is substantially reduced. Another objective of the present invention is to provide a device which breaks down fatty compounds in the waste fluid, so that these compounds do not burn solidly onto the pipe wall in the part of the drain pipe that is provided with a heating element.

This is achieved according to the present invention by a filter device for placement in a utility sink in an aircraft for filtering particulate material, and for dissolving and/or taking up fatty compounds from the waste fluid, characterized in that the device comprises a basin having one or more bottom outlets and a filter element located at the bottom of the basin, which basin has a shape adapted to the shape of the sink.

The bottom outlet is preferably made up of a plurality of through-going apertures.

The filter element consists preferably of a porous plastic material or wire netting web coated or impregnated with an enzyme- and/or soap-containing compound.

BRIEF DESCRIPTION OF THE DRAWING

The invention will be explained in more detail in the following with the aid of an embodiment example with reference to the accompanying drawing, which shows a section through the device in accordance with the invention.

DESCRIPTION OF THE PREFERRED EMBODIMENT

Figure 1:
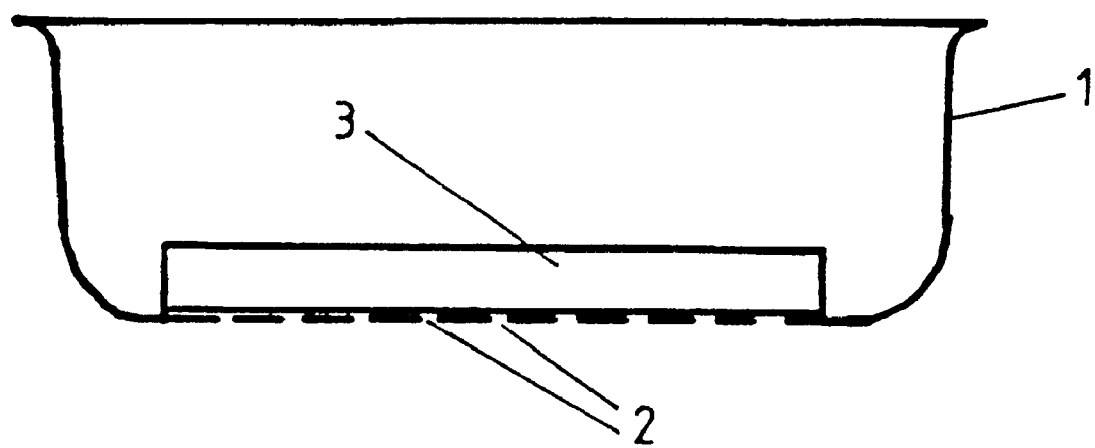

In the FIGURE there is shown a device in accordance with the invention consisting of a basin 1 produced, for example, from vacuum formed plastic or a similar material, having a shape adapted to the interior shape of a utility sink in an aircraft. At the bottom of basin 1 is an outlet means in the form of a row of small, through-going apertures 2 or, optionally, an end piece or sleeve (not shown) which is positioned in the drain in the sink. At the bottom of basin 1 is provided a filter element 3. This filter element 3 may, for example, consist of a porous material, e.g., foamed plastic, wire netting web or the like, which will hold back particulate material over a certain size. In addition, filter element 3 may be coated or impregnated with an enzyme- and/or soap-containing agent capable of dissolving fat, so that the fat is dispersed in the aqueous fluid.

Optionally the filter element 3 may consist of a material which both filters away particulate material and absorbs fatty compounds.

What is claimed is:

1. In a utility sink for an aircraft having a sink-shaped basin and one or more outlets in the bottom of the basin for the discharge of waste fluid, the improvement comprising:
    a filter element located at the bottom of the basin for filtering waste fluid discharged through said one or more outlets, said filter being effective to filter particulate material and to dissolve and/or absorb fatty compounds from the waste fluid.

2. The utility sink of claim 1, wherein said one or more bottom outlets comprise a plurality of through-going apertures.

3. The utility sink of claim 1 or 2, wherein the filter element is comprised of a porous plastic material or a wire netting which is coated or impregnated with an enzyme and/or a soap-containing compound.

* * * * *